United States Patent
Yang

(10) Patent No.: US 11,700,022 B2
(45) Date of Patent: Jul. 11, 2023

(54) DIPLEXER FOR DUAL-BAND WI-FI APPLICATIONS

(71) Applicant: RichWave Technology Corp., Taipei (TW)

(72) Inventor: Chin-Lung Yang, Taipei (TW)

(73) Assignee: RichWave Technology Corp., Taipei (TW)

( * ) Notice: Subject to any disclaimer, the term of this patent is extended or adjusted under 35 U.S.C. 154(b) by 5 days.

(21) Appl. No.: 17/678,034

(22) Filed: Feb. 23, 2022

(65) Prior Publication Data
US 2023/0179232 A1   Jun. 8, 2023

(30) Foreign Application Priority Data
Dec. 8, 2021   (TW) .................................. 110145894

(51) Int. Cl.
*H04B 1/00* (2006.01)
*H04B 1/16* (2006.01)

(52) U.S. Cl.
CPC ........... *H04B 1/0057* (2013.01); *H04B 1/163* (2013.01)

(58) Field of Classification Search
CPC .............................. H04B 1/0057; H04B 1/163
USPC ..................................................... 455/552.1
See application file for complete search history.

(56) References Cited

U.S. PATENT DOCUMENTS

| | | | |
|---|---|---|---|
| 2006/0006960 A1* | 1/2006 | Lin | H03H 7/463 333/132 |
| 2009/0017775 A1 | 1/2009 | Qiao | |
| 2011/0018653 A1 | 1/2011 | Bradley | |
| 2011/0136460 A1 | 6/2011 | Cho | |
| 2014/0233441 A1* | 8/2014 | Lee | H03H 7/463 370/297 |
| 2017/0077877 A1 | 3/2017 | Anderson | |
| 2017/0214390 A1* | 7/2017 | Tsukamoto | H03H 7/1766 |
| 2019/0028085 A1* | 1/2019 | Kato | H03H 9/725 |
| 2019/0341909 A1 | 11/2019 | Nosaka | |
| 2021/0104996 A1* | 4/2021 | Mori | H03H 7/1783 |

OTHER PUBLICATIONS

Office action dated Oct. 31, 2022 for the Taiwan application No. 110145894, filing date Dec. 8, 2021, pp. 1-5.

* cited by examiner

*Primary Examiner* — Tanmay K Shah
(74) *Attorney, Agent, or Firm* — Winston Hsu

(57) ABSTRACT

A diplexer includes a first filter circuit, and a second filter circuit. The first filter circuit is coupled to a first port for providing a first signal path for a first radio frequency (RF) signal. The second filter circuit is coupled to the first port for providing a second signal path for a second RF signal. The first filter circuit includes a first tunable resonant circuit for tuning a first transmission zero corresponding to a first frequency multiplication of the first RF signal. The second filter circuit includes a second tunable resonant circuit for tuning a first transmission zero corresponding to a first frequency multiplication of the second RF signal. The first frequency multiplication of the first RF signal corresponding to the first filter circuit is a fourth harmonic of the first RF signal.

20 Claims, 3 Drawing Sheets

DIPLEXER FOR DUAL-BAND WI-FI APPLICATIONS

TECHNICAL FIELD

The present invention is related to a diplexer, more particularly to a diplexer for dual-band Wi-Fi applications.

BACKGROUND

A diplexer is a passive device that implements frequency-domain multiplexing with signals on two ports multiplexed onto a third port without interfering each other. It allows two different devices to share a common communications channel. Also, it is implemented to prevent intermodulation of signals and to keep reflected power to a minimum for each input signal.

Diplexers include categories such as low temperature co-fired ceramic (LTCC) diplexers, integrated passive device (IPD) diplexers, and thin film diplexers. However, it is difficult for the aforementioned diplexers to achieve a balanced trade-off between insertion loss (IL), layout size, manufacturing cost, and stopband suppression. Therefore, achieving a diplexer with low insertion loss, minimal layout size, low cost, and superior stopband suppression is an urgent problem in the industry.

SUMMARY

An embodiment provides a diplexer including a first filter circuit, a second filter circuit, a first port, a second port and a third port. The first filter circuit is coupled to the first port for providing a first signal path for a first radio frequency (RF) signal. The second port is coupled to the first filter circuit. The second filter circuit is coupled to the first port for providing a second signal path for a second RF signal. The third port is coupled to the second filter circuit. The first filter circuit includes a first tunable resonant circuit for tuning a first transmission zero corresponding to a first frequency multiplication of the first RF signal. The second filter circuit includes a second tunable resonant circuit for tuning a first transmission zero corresponding to a first frequency multiplication of the second RF signal. The first frequency multiplication of the first RF signal corresponding to the first filter circuit is a fourth harmonic of the first RF signal.

DETAILED DESCRIPTION

Figure 1:
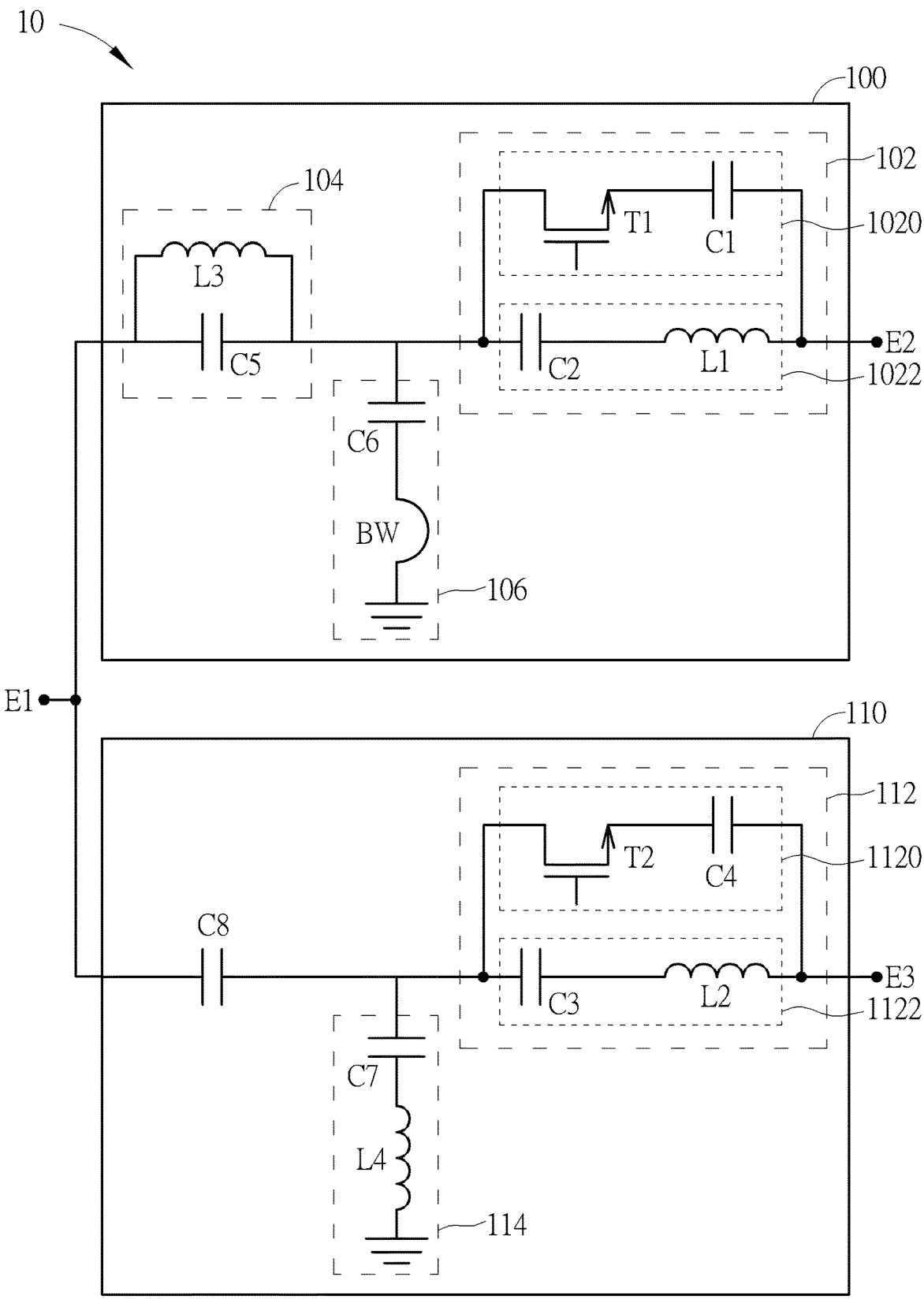
FIG. 1 is a diagram illustrating a diplexer of an embodiment of the present invention.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a diagram illustrating a diplexer 10 of an embodiment of the present invention. The diplexer 10 includes a first filter circuit 100, a second filter circuit 110, a first port E1, a second port E2 and a third port E3. The first filter circuit 100 is coupled to the first port E1 for providing a first signal path for a first radio frequency (RF) signal. The second port E2 is coupled to the first filter circuit 100. The second filter circuit 110 is coupled to the first port E1 for providing a second signal path for a second RF signal. The third port E3 is coupled to the second filter circuit 110. The first filter circuit 100 includes a first tunable resonant circuit 102 for tuning a first transmission zero corresponding to a first frequency multiplication of the first RF signal. The second filter circuit 110 includes a second tunable resonant circuit 112 for tuning a first transmission zero corresponding to a first frequency multiplication of the second RF signal. The first frequency multiplication of the first RF signal corresponding to the first filter circuit 100 is a fourth harmonic of the first RF signal.

In an embodiment, the carrier frequency of the first RF signal can be different from the frequency of the second RF signal. In another embodiment, the carrier frequency of the second RF signal can be a multiple of the carrier frequency of the first RF signal substantially. For example, the carrier frequency of the second RF signal may be approximately double of the carrier frequency of the first RF signal. In a more concrete example, the carrier frequency of the first RF signal may be between 2.4 GHz to 2.483 GHz and the carrier frequency of the second RF signal may be between 5.15 GHz to 5.85 GHz. The carrier frequency of the first RF signal and the second RF signal can be determined according to a communication protocol (such as the IEEE 802.11 communication protocol).

In an embodiment, the first filter circuit 100 further includes a first resonant unit 104 and a second resonant unit 106. The first resonant unit 104 is coupled between the first port E1 and the first tunable resonant circuit 102 to provide a second transmission zero corresponding to the second harmonic of the first RF signal. The second resonant unit 106 is coupled between the first resonant unit 104 and the first tunable resonant circuit 102 to provide a third transmission zero corresponding to a third harmonic of the first RF signal. In other words, the first resonant unit 104 and the second resonant unit 106 can respectively filter out the second harmonic and third harmonic of the first RF signal. That is, through the first tunable resonant circuit 102 and its corresponding first transmission zero, the first resonant unit 104 and its corresponding second transmission zero, and the second resonant unit 106 and its corresponding third transmission zero, the first filter circuit 100 can respectively filter out the fourth harmonic, the second harmonic and the third harmonic of the first RF signal.

In an embodiment, the first tunable resonant circuit 102 of the diplexer 10 may include a capacitor circuit 1020. The capacitor circuit 1020 includes a capacitor C1 and a transistor T1, and the transistor T1 and the capacitor C1 are coupled in series. The first tunable resonant circuit 102 may further include an LC (inductor-capacitor) series circuit 1022, and the LC series circuit 1022 of the first tunable resonant circuit 102 is coupled in parallel to the capacitor circuit 1020 of the first tunable resonant circuit 102. The LC series circuit 1022 includes an inductor L1 and a capacitor C2. The inductor L1 has a spiral shape.

The capacitance of the capacitor circuit 1020 can be adjusted according to the transistor T1 in the capacitor circuit 1020 (for example, according to the control voltage or other parameters of the transistor T1). For example, by adjusting the control voltage of the transistor T1, the capacitor circuit 1020 can be treated as a variable capacitor. By adjusting the capacitance of the capacitor circuit 1020, the first transmission zero of the first RF signal corresponding to the fourth harmonic of the first RF signal can be tuned. When the transistor T1 is used to control the capacitor circuit 1020, the control voltage of the transistor T1 can be adjusted according to the manufacturing process. For example, for a transistor T1 manufactured with 0.18 micron (μm) process, the control voltage of the transistor T1 can be approximately 0~1.8 volts. With the implementation of the transistor T1, the first tunable resonant circuit 102 can effectively overcome variation from the manufacturing process, thus maintaining the transmission zero staying at the required frequency.

The second filter circuit 110 may further include a third resonant unit 114. The third resonant unit 114 is coupled between the first port E1 and the second tunable resonant circuit 112 for providing a second transmission zero corresponding to the second RF signal. In other words, the third resonant unit 114 can filter out undesired signal noise of specific frequencies in the second RF signal.

In an embodiment, the second tunable resonant circuit 112 of the diplexer 10 includes an LC series circuit 1122 and a capacitor circuit 1120. The LC series circuit 1122 of the second tunable resonant circuit 112 includes an inductor L2 and a capacitor C3. The inductor L2 has a spiral shape. The inductor L1 and the inductor L2 have different spiral directions. The capacitor circuit 1120 of the second tunable resonant circuit 112 includes a capacitor C4 and a transistor T2. The transistor T2 is coupled in series to the capacitor C4 for adjusting a capacitance of the capacitor circuit 1120 of the second tunable resonant circuit 112.

The capacitance of the capacitor circuit 1120 can be adjusted according to the transistor T2 (for example, according to the control voltage or other parameters of the transistor T2). In other words by adjusting the control voltage of the transistor T2, the capacitor circuit 1120 can be treated as a variable capacitor. By adjusting the capacitance of the capacitor circuit 1120, the frequency of the first transmission zero of the second RF signal corresponding to the second harmonic of the second RF signal can be tuned. When the transistor T2 is used to control the capacitor circuit 1120, the control voltage of the transistor T2 can be adjusted according to manufacturing process. For example, for the transistor T2 manufactured with 0.18 micron (μm) process, the control voltage of the transistor T2 can be 0~1.8 volts. With the implementation of the transistor T2, the second tunable resonant circuit 112 can effectively overcome variation from the manufacturing process, thus maintaining the transmission zero staying at the proper frequency.

In addition, with the transistor T2 acting in the capacitor circuit 1120, the drift of the capacitor C3 due to process variation can be overcome so that the first transmission zero of the second RF signal can stay at the required frequency.

In addition, the first resonant unit 104 of the first filter circuit 100 includes an inductor L3 and a capacitor C5. The inductor L3 of the first resonant unit 104 is coupled in parallel with the capacitor C5. The inductor L3 of the first resonant unit 104 of the first filter circuit 100 has a spiral shape. The second resonant unit 106 of the first filter circuit 100 includes a capacitor C6 and a bond wire BW. The bond wire BW of the second resonant unit 106 is coupled in series to the capacitor C6. Through the LC parallel circuit formed by the inductor L3 and the capacitor C5, the first resonant unit 104 can filter out the second harmonic of the first RF signal. Through the circuit formed by the bond wire BW and the capacitor C6, the second resonant unit 106 can filter out the third harmonic of the first RF signal.

In an embodiment, the third resonant unit 114 of the second filter circuit 110 includes an inductor L4 and a capacitor C7. The inductor L4 of the third resonant unit 114 and the capacitor C7 are coupled in series. The inductor L4 of the third resonant unit 114 has a spiral shape. Through the LC series circuit formed by the inductor L4 and the capacitor C7, the third resonant unit 114 can filter out a frequency signal corresponding to the second transmission zero of the second RF signal. For example, when the carrier frequency of the second RF signal falls between 5.15 GHz and 5.85 GHz, the third resonant unit 114 corresponding to the second transmission zero of the second RF signal can filter out signals with frequency around 2.4 GHz.

In other words, the third resonant unit 114 can filter out undesired signal noise of specific frequencies in the second RF signal. The second filter circuit 110 may have the second transmission zero of the second RF signal. When the second RF signal (such as 5 GHz) passes through the second signal path, the second transmission zero can filter out the noise of the first RF signal (such as 2.4 GHz), thus reducing the noise of the signal at the receiving end and maintaining the performance of the diplexer 10. The second tunable resonant circuit 112 of the second filter circuit 110 provides the first transmission zero corresponding to the first frequency multiplication of the second RF signal. For example, the first frequency multiplication can be the second harmonic of the second RF signal. Therefore, the second tunable resonant circuit 112 can filter out the second harmonic of the second RF signal.

In an embodiment, the spiral directions of the inductor L1 and the inductor L3 of the first filter circuit 100 are the same. The spiral directions of the inductor L1 and the inductor L3 are different from the spiral directions of the inductor L2 and the inductor L4 of the second filter circuit 110. For example, the spiral direction of the inductor L2 and the inductor L4 can be clockwise, and the spiral direction of the inductor L1 and the inductor L3 can be counterclockwise.

In an embodiment, the second filter circuit 110 further includes a capacitor C8. The capacitor C8 is coupled between the first port E1 and the second tunable resonant circuit 112.

In an embodiment, the first filter circuit 100 and the second filter circuit 110 are manufactured with silicon on insulator (SOI) technology. In other embodiments, the capacitors and inductors in the first filter circuit 100 and the second filter circuit 110 can be integrated passive devices (IPD), and the transistors can be manufactured with CMOS processes according to actual requirements. By implementing integrated passive devices, the cost of the diplexer 10 can be effectively reduced.

In an embodiment, the first filter circuit 100 can receive the first RF signal from the first port E1 or the second port E2 In addition, the first filter circuit 100 can transmit the first RF signal to the first port E1 or the second port E2. In other words, the first port E1 and the second port E2 can be used for signal transmitting and receiving for the first filter circuit 100. The first signal path of the first filter circuit 100 for the first RF signal can be between the first port E1 and the second port E2 in both directions. The second filter circuit 110 can receive the second RF signal from the first port E1 or the third port E3. The second filter circuit 110 can transmit the second RF signal to the first port E1 or the third port E3. In other words, the first port E1 and the third port E3 can be used for signal transmitting and receiving for the second filter circuit 110. The second signal path of the second filter circuit 100 for the second RF signal can be between the first port E1 and the third port E3 in both directions.

Figure 2:
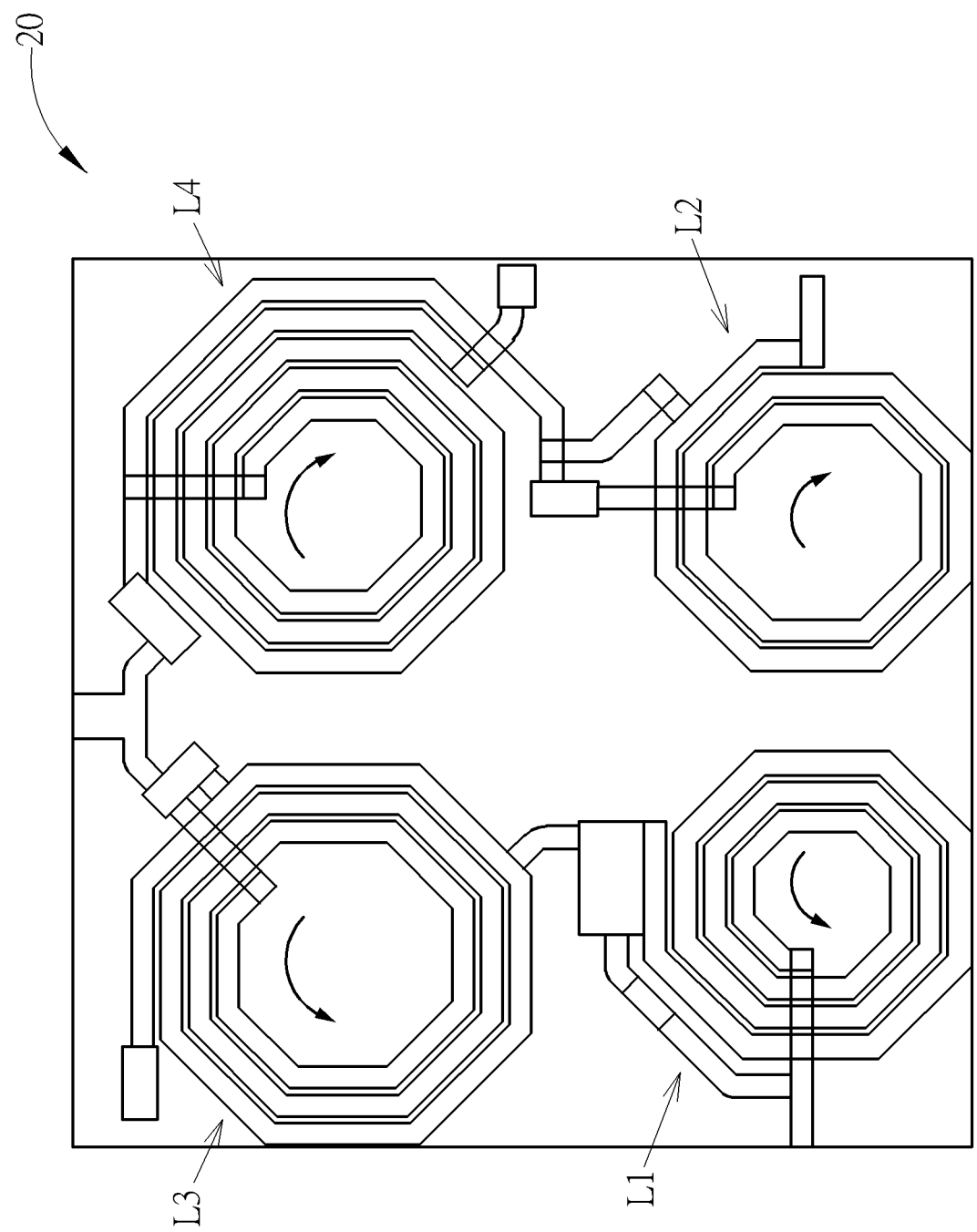
FIG. 2 is a diagram illustrating a layout of the diplexer of FIG. 1.

FIG. 2 is a diagram illustrating a layout 20 of the diplexer 10 of FIG. 1. Only the layout of the inductor L1, the inductor L2, the inductor L3, and the inductor L4 of the diplexer 10 are illustrated in FIG. 2. As shown in FIG. 2, the first tunable resonant circuit 102 includes an inductor L1, and the first resonant unit 104 includes an inductor L3. The inductor L1 and the inductor L3 have the same spiral direction. For example, the spiral direction of the inductor L1 and the inductor L3 can be counterclockwise. The second tunable resonant circuit 112 includes an inductor L2, and the third resonant unit 114 includes an inductor L4. The inductor L2 and the inductor L4 have the same spiral direction. For example, the spiral direction of the inductor L2 and the inductor L4 may be clockwise. In other words, the spiral direction of the inductor L1 of the first tunable resonant circuit 102 is different from the spiral direction of the inductor L2 of the second tunable resonant circuit 112. The spiral direction of the inductor L3 of the first resonant unit 104 is different from the spiral direction of the inductor L4 of the third resonant unit 114. By placing the inductors of the first filter circuit 100 (i.e., the inductors L1 and L3) and the inductors of the second filter circuit 110 (i.e., the inductors L2 and L4) in different spiral directions, the magnetic coupling between the components of the diplexer 10 can be reduced and thus reducing the electromagnetic interference between the components of the diplexer 10.

Furthermore, since the number of inductors in the diplexer 10 is less than the number of inductors in a diplexer of the prior art, the diplexer 10 can be formed on a 600 μm×600 μm high-resistance silicon substrate. The diplexer of the prior art needs to be formed on a 1600 μm×800 μm substrate. Therefore, the layout size of the diplexer 10 disclosed in the present invention can be smaller.

Figure 3:
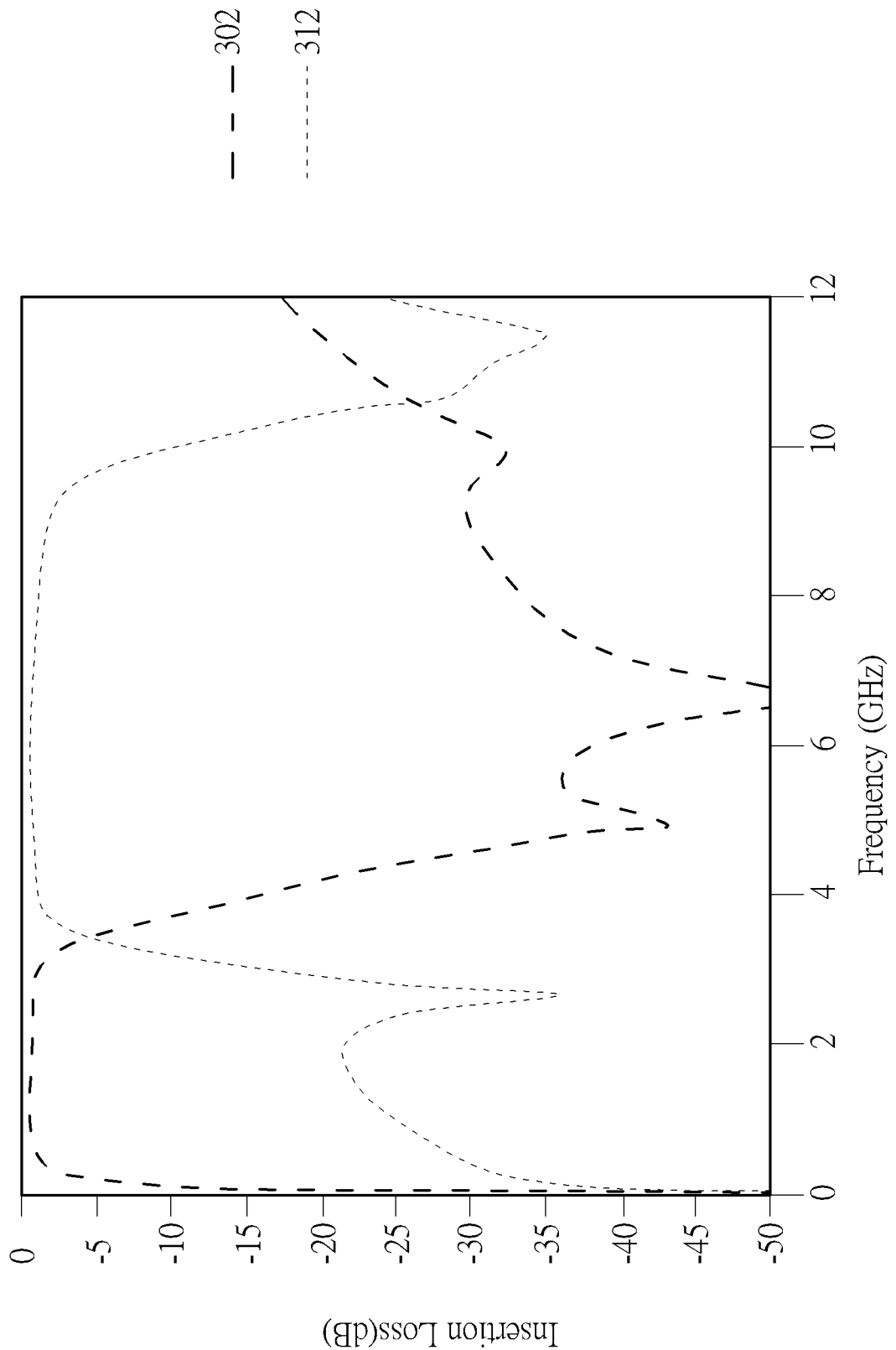
FIG. 3 is a diagram illustrating insertion loss of the diplexer of FIG. 1.

FIG. 3 is a diagram illustrating insertion loss 30 of the diplexer 10 of FIG. 1. In FIG. 3, the horizontal axis represents the frequency of the RF signal in gigahertz (GHz), and the vertical axis represents the insertion loss (IL) of the RF signal in decibels (dB). The first RF signal has a carrier frequency of 2.4 GHz. The curve 302 is the insertion loss of the first RF signal passing through the first filter circuit 100 of the diplexer 10. As shown by the curve 302, when the first RF signal passes through the first filter circuit 100 of the diplexer 10, the insertion loss of the second harmonic (around 4.8 GHz), the third harmonic (around 7.2 GHz), and the fourth harmonic (around 9.6 GHz) of the first RF signal are approximately −40 dB, −43 dB and −31 dB (that is, of the first filter circuit 100) respectively. The second harmonic, the third harmonic, and the fourth harmonic correspond respectively to the second transmission zero of the first resonant unit 104, the third transmission zero of the second resonant unit 106, and the first transmission zero of the first tunable resonant circuit 102. In other words, the effect of the three transmission zeros of the diplexer 10 in filtering the second, third, and fourth harmonics of RF signals is better than the diplexer of the prior art.

In FIG. 3, the second RF signal has a carrier frequency of 5 GHz. The curve 312 is the insertion loss of the second RF signal passing through the second filter circuit 110 of the diplexer 10. The frequency of the transmission zeros of the diplexer of the prior art is at approximately 2.5 GHz and 3.2 GHz, and the insertion loss is approximately −33 dB and −38 dB respectively. When the second RF signal passes through the second filter circuit 110 of the diplexer 10, the frequency of the first transmission zero is at approximately 11.5 GHz (corresponding to the transmission zero of the first tunable resonant circuit 112). The frequency of the second transmission zero is at approximately about 2.6 GHz, and its insertion loss is approximately −36 dB (corresponding to the second transmission zero of the third resonant unit 114). In other words, even though the diplexer of the prior art and the second filter circuit 110 of the diplexer 10 both have two transmission zeros corresponding to the second RF signal, the diplexer of the prior art cannot filter out the second harmonic of the second RF signal. In contrast, the diplexer 10 of the present invention has a transmission zero corresponding to the second harmonic of the second RF signal, which can filter out the second harmonic of the second RF signal.

In summary, the present invention discloses a diplexer for Wi-Fi applications with low insertion loss, minimal layout size, reduced cost, and superior stopband suppression. The diplexer of the present invention can achieve better filtering performance on the second and third harmonics of RF signal. With less number of inductors, the layout size can be minimized and the cost can also be reduced. Thus, the diplexer of the present invention can have good performance with a simple structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A diplexer comprising:
   a first port;
   a first filter circuit coupled to the first port, and configured to provide a first signal path for a first radio frequency (RF) signal, the first filter circuit comprising:
      a first tunable resonant circuit configured to tune a first transmission zero corresponding to a first frequency multiplication of the first RF signal;
   a second port coupled to the first filter circuit;
   a second filter circuit coupled to the first port, and configured to provide a second signal path for a second RF signal, the second filter circuit comprising:
      a second tunable resonant circuit configured to tune a first transmission zero corresponding to a first frequency multiplication of the second RF signal; and
   a third port coupled to the second filter circuit;
   wherein the first frequency multiplication of the first RF signal corresponding to the first filter circuit is a fourth harmonic of the first RF signal.

2. The diplexer of claim 1, wherein a carrier frequency of the first RF signal is different from a carrier frequency of the second RF signal.

3. The diplexer of claim 2, wherein the carrier frequency of the second RF signal is substantially a multiple of the carrier frequency of the first RF signal.

4. The diplexer of claim 3, wherein the carrier frequency of the first RF signal and the carrier frequency of the second RF signal are determined according to an IEEE 802.11 communication protocol.

5. The diplexer of claim 2, wherein the first filter circuit has a second transmission zero corresponding to a second frequency multiplication of the first RF signal, and the second frequency multiplication is a second harmonic of the first RF signal.

6. The diplexer of claim 5, wherein the first filter circuit has a third transmission zero corresponding to a third frequency multiplication of the first RF signal, and the third frequency multiplication is a third harmonic of the first RF signal.

7. The diplexer of claim 5, wherein:
the first tunable resonant circuit comprises a first inductor having a spiral shape;
the second tunable resonant circuit comprises a second inductor having a spiral shape; and
the first inductor and the second inductor have different spiral directions.

8. The diplexer of claim 2, wherein the first tunable resonant circuit comprises a first capacitor circuit, and the first capacitor circuit comprises:
a first capacitor; and
a first transistor coupled in series to the first capacitor.

9. The diplexer of claim 8, wherein the first tunable resonant circuit comprises a first LC (inductor-capacitor) series circuit coupled in parallel to the first capacitor circuit, and a capacitance of the first capacitor circuit is adjusted according to the first transistor of the first capacitor circuit.

10. The diplexer of claim 9, wherein:
the first tunable resonant circuit comprises a first inductor having a spiral shape;
the second tunable resonant circuit comprises a second inductor having a spiral shape; and
the first inductor and the second inductor have different spiral directions.

11. The diplexer of claim 2, wherein the second filter circuit has a first transmission zero corresponding to the first frequency multiplication of the second RF signal, and the first frequency multiplication of the second filter circuit is a second harmonic of the second RF signal.

12. The diplexer of claim 1, wherein the first filter circuit further comprises:
a first resonant unit coupled between the first port and the first tunable resonant circuit, and configured to provide a second transmission zero corresponding to a second harmonic of the first RF signal; and
a second resonant unit coupled between the first resonant unit and the first tunable resonant circuit, and configured to provide a third transmission zero corresponding to a third harmonic of the first RF signal.

13. The diplexer of claim 12, wherein the second filter circuit further comprises a third resonant unit coupled between the first port and the second tunable resonant circuit, and configured to provide a second transmission zero corresponding to the second RF signal.

14. The diplexer of claim 13, wherein the first tunable resonant circuit comprises:
a first capacitor circuit; and
a first LC series circuit, comprising:
a first inductor having a spiral shape; and
a second capacitor.

15. The diplexer of claim 14, wherein the first capacitor circuit of the first tunable resonant circuit comprises:
a first capacitor; and
a first transistor coupled in series to the first capacitor, and configured to adjust a capacitance of the first capacitor circuit of the first tunable resonant circuit.

16. The diplexer of claim 15, wherein the second tunable resonant circuit comprises:
a second capacitor circuit; and
a second LC series circuit, comprising:
a second inductor having a spiral shape; and
a third capacitor.

17. The diplexer of claim 16, wherein the second capacitor circuit of the second tunable resonant circuit comprises:
a fourth capacitor; and
a second transistor coupled in series to the fourth capacitor of the second capacitor circuit, and configured to adjust a capacitance of the second capacitor circuit of the second tunable resonant circuit.

18. The diplexer of claim 17, wherein:
the first resonant unit of the first filter circuit comprises:
a fifth capacitor; and
a third inductor coupled in parallel to the fifth capacitor of the first resonant unit, the third inductor having a spiral shape; and
the second resonant unit of the first filter circuit comprises:
a sixth capacitor; and
a bond wire coupled in series to the sixth capacitor of the second resonant unit.

19. The diplexer of claim 18, wherein the third resonant unit of the second filter circuit comprises:
a seventh capacitor; and
a fourth inductor coupled in series to the seventh capacitor of the third resonant unit, the fourth inductor having a spiral shape.

20. The diplexer of claim 19, wherein the first inductor and the third inductor have a spiral direction, the second inductor and the fourth inductor have another spiral direction different from the spiral direction of the first inductor.

* * * * *